(12) United States Patent
Sakuma et al.

(10) Patent No.: US 12,216,309 B2
(45) Date of Patent: Feb. 4, 2025

(54) OPTICAL FIBER

(71) Applicant: SUMITOMO ELECTRIC INDUSTRIES, LTD., Osaka (JP)

(72) Inventors: Hirotaka Sakuma, Osaka (JP); Yoshiaki Tamura, Osaka (JP); Yuki Kawaguchi, Osaka (JP); Masato Suzuki, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 267 days.

(21) Appl. No.: 17/754,581

(22) PCT Filed: Oct. 20, 2020

(86) PCT No.: PCT/JP2020/039370
§ 371 (c)(1),
(2) Date: Apr. 6, 2022

(87) PCT Pub. No.: WO2021/085236
PCT Pub. Date: May 6, 2021

(65) Prior Publication Data
US 2023/0266523 A1    Aug. 24, 2023

(30) Foreign Application Priority Data
Oct. 31, 2019    (JP) .................................. 2019-198768

(51) Int. Cl.
*G02B 6/02*    (2006.01)
*C03B 37/012*    (2006.01)
*C03B 37/014*    (2006.01)

(52) U.S. Cl.
CPC ..... *G02B 6/02395* (2013.01); *G02B 6/02009* (2013.01); *C03B 37/01228* (2013.01);
(Continued)

(58) Field of Classification Search
CPC ............ G02B 6/02395; G02B 6/02009; C03B 37/01228; C03B 37/01248; C03B 37/014;
(Continued)

(56) References Cited

U.S. PATENT DOCUMENTS

| | | | |
|---|---|---|---|
| 5,146,534 A | 9/1992 | Lines | |
| 6,658,190 B2 * | 12/2003 | Hirano | ............... G02B 6/02019 385/124 |

(Continued)

FOREIGN PATENT DOCUMENTS

| | | |
|---|---|---|
| CN | 102654602 A | 2/2014 |
| JP | 2013-518312 A | 5/2013 |

(Continued)

OTHER PUBLICATIONS

Glaesemann, G. Scott, excerpts from Optical Fiber Mechanical Reliability—Review of Research at Corning's Optical Fiber Strength Laboratory, White Paper, Available at https://www.corning.com/media/worldwide/coc/documents/Fiber/whitepaper/WP8002.pdf (Year: 2017).*

(Continued)

*Primary Examiner* — Peter Radkowski
(74) *Attorney, Agent, or Firm* — MCDONALD HOPKINS LLC

(57) ABSTRACT

An optical fiber is formed from silica-based glass. The optical fiber includes a core including a central axis and a cladding surrounding the core. A refractive index of the core is greater than a refractive index of the cladding. The core contains chlorine, and one or more kinds of elements selected from an element group consisting of alkali metal elements and alkaline earth metal elements. A relative refractive index difference of the core based on a refractive (Continued)

index of pure silica is 0.00% or greater and 0.15% or less. An average concentration of fluorine in the cladding is 1.2% or less in a mass fraction.

10 Claims, 4 Drawing Sheets

(52) U.S. Cl.
    CPC ...... *C03B 37/01248* (2013.01); *C03B 37/014* (2013.01); *C03B 2201/12* (2013.01); *C03B 2201/20* (2013.01); *C03B 2201/50* (2013.01); *C03B 2201/54* (2013.01); *C03B 2203/02* (2013.01)

(58) Field of Classification Search
    CPC ............ C03B 2201/12; C03B 2201/20; C03B 2201/50; C03B 2201/54; C03B 2203/02
    See application file for complete search history.

(56) References Cited

U.S. PATENT DOCUMENTS

| | | | | |
|---|---|---|---|---|
| 7,068,901 | B2* | 6/2006 | Hirano | G02B 6/03644 385/127 |
| 7,088,900 | B1 | 8/2006 | Mishra | |
| 7,376,316 | B2* | 5/2008 | Sasaki | G02B 6/03666 385/127 |
| 7,822,307 | B1* | 10/2010 | Tanaka | G02B 6/4403 385/100 |
| 8,315,495 | B2* | 11/2012 | Bickham | G02B 6/02019 385/127 |
| 8,655,133 | B2* | 2/2014 | Yamamoto | G02B 6/02019 398/208 |
| 9,020,316 | B2* | 4/2015 | Bookbinder | G02B 6/03627 385/124 |
| 9,588,286 | B2* | 3/2017 | Haruna | G02B 6/03644 |
| 9,802,858 | B2* | 10/2017 | Bookbinder | G02B 6/0288 |
| 9,817,184 | B2* | 11/2017 | Tamura | G02B 6/03694 |
| 10,031,285 | B2* | 7/2018 | Nakanishi | G02B 6/02214 |
| 10,150,695 | B2* | 12/2018 | Bookbinder | C03C 13/046 |
| 10,155,687 | B2* | 12/2018 | Tamura | C03C 13/046 |
| 2009/0274428 | A1 | 11/2009 | Chen et al. | |
| 2010/0195966 | A1* | 8/2010 | Bickham | G02B 6/02019 385/127 |
| 2011/0211788 | A1* | 9/2011 | Yamamoto | G02B 6/02019 385/28 |
| 2012/0198891 | A1* | 8/2012 | Tamura | C03B 37/01228 65/412 |
| 2012/0198892 | A1* | 8/2012 | Tamura | C03B 37/01861 65/428 |
| 2014/0241684 | A1* | 8/2014 | Bookbinder | G02B 6/02019 385/124 |
| 2016/0304392 | A1* | 10/2016 | Bookbinder | G02B 6/03627 |
| 2016/0318793 | A1* | 11/2016 | Tamura | C03C 13/046 |
| 2017/0101334 | A1* | 4/2017 | Haruna | C03B 37/01245 |
| 2017/0108642 | A1 | 4/2017 | Tamura et al. | |
| 2017/0351022 | A1* | 12/2017 | Nakanishi | G02B 6/03616 |
| 2018/0002221 | A1* | 1/2018 | Bookbinder | C03C 13/045 |
| 2018/0016181 | A1* | 1/2018 | Tamura | C03C 3/06 |
| 2019/0049681 | A1* | 2/2019 | Bookbinder | G02B 6/0365 |
| 2019/0270662 | A1* | 9/2019 | Haruna | C03B 37/01869 |
| 2019/0293887 | A1* | 9/2019 | Bookbinder | G02B 6/4494 |
| 2020/0393613 | A1 | 12/2020 | Tamura et al. | |

FOREIGN PATENT DOCUMENTS

| | | |
|---|---|---|
| JP | 2017-076053 A | 4/2017 |
| JP | 2018-516386 A | 6/2018 |
| WO | 2011-094256 A1 | 8/2011 |
| WO | 2016-168042 A1 | 10/2016 |
| WO | 2019-172197 A1 | 9/2019 |

OTHER PUBLICATIONS

International Search Report dated Jan. 12, 2021 issued in Patent Application No. PCT/JP2020/039370.

* cited by examiner

OPTICAL FIBER

TECHNICAL FIELD

The present disclosure relates to an optical fiber. The present application is based upon and claims the benefit of the priority from Japanese patent application No. 2019-198768, filed on Oct. 31, 2019, which is hereby incorporated by reference in its entirety.

BACKGROUND ART

In general, when a core of silica-based glass contains an alkali metal element or an alkaline earth metal element, viscosity of a core portion is reduced when manufacturing the optical fiber by drawing an optical fiber base material, and rearrangement of glass is promoted. Accordingly, a transmission loss due to Rayleigh scattering of the optical fiber is reduced. In the following description, both the alkali metal element and the alkaline earth metal element are referred to as "alkali metal element group".

Patent Literature 1 discloses an optical fiber in which an alkali metal element is added to a core. In the optical fiber, a concentration of the alkali metal element in the core and a concentration of fluorine in a cladding are optimized, and thus a reduction in the transmission loss is realized.

CITATION LIST

Patent Literature

Patent Literature 1: U.S. Pat. No. 5,146,534

SUMMARY OF INVENTION

An optical fiber according to an embodiment of the present disclosure is formed from silica-based glass. The optical fiber includes: a core including a central axis; and a cladding surrounding the core. A refractive index of the core is greater than a refractive index of the cladding. The core contains chlorine, and one or more kinds of elements selected from an element group consisting of alkali metal elements and alkaline earth metal elements. A relative refractive index difference of the core based on a refractive index of pure silica is 0.00% or greater and 0.15% or less. An average concentration of fluorine in the cladding is 1.2% or less in a mass fraction.

An optical fiber according to another embodiment of the present disclosure is formed from silica-based glass. The optical fiber includes a core including a central axis; and a cladding surrounding the core. A refractive index of the core is greater than a refractive index of the cladding. The core contains chlorine, and one or more kinds of elements selected from an element group consisting of alkali metal elements and alkaline earth metal elements. A relative refractive index difference of the core based on a refractive index of pure silica is −0.15% or greater and 0.05% or less. An average concentration of fluorine in the cladding is 1.4% or less in a mass fraction.

DESCRIPTION OF EMBODIMENTS

Figure 1:
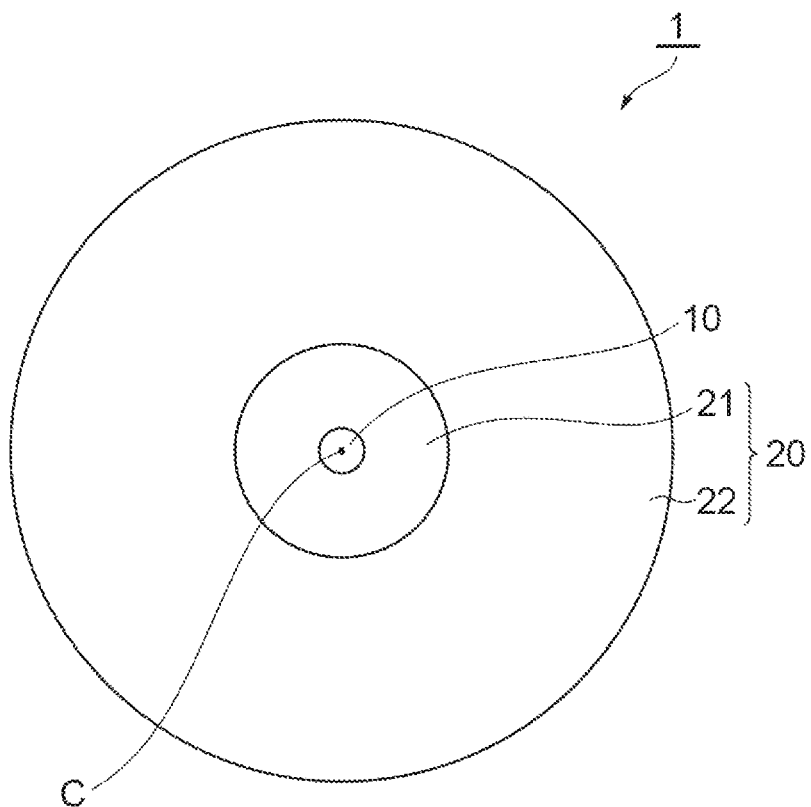
FIG. 1 is a cross-sectional view of an optical fiber according to an embodiment.

Problems to be Solved by Present Disclosure

In a state of an optical fiber base material, an alkali metal element group added to a central portion of a core portion diffuses at the time of drawing. According to this, in a core containing the alkali metal element group, in a case where chlorine is not contained (or in a case where the amount of chlorine is small), a bond of a glass molecular structure is broken, and a glass defect occurs. Accordingly, in an obtained optical fiber, a transmission loss due to the glass defect increases. In a case where the core portion contains a sufficient amount of chlorine, the chlorine is bonded to the glass defect, and thus occurrence of the glass defect is suppressed. As a result, an increase in the transmission loss due to the glass defect is suppressed.

In Patent Literature 1, it is described that a concentration of the alkali metal element in a core and a concentration of fluorine in a cladding have an influence on the transmission loss. As can be seen from the description, a fluctuation in the concentration of fluorine in the cladding also has an influence on the transmission loss. That is, a reduction in the transmission loss can be realized by optimizing the concentration of the fluorine in the cladding. However, a refractive index of the core is determined, it is necessary to set a refractive index of the cladding to the determined refractive index in order to keep optical characteristics such as cutoff within a constant range. Accordingly, it is considered that there is no actual degree of freedom in design of the concentration of fluorine in the cladding. Under this consideration, it is difficult to realize optimization of the concentration of fluorine in the cladding and a further reduction in the transmission loss.

Here, an object is to provide an optical fiber capable of realizing a further reduction in the transmission loss.

Effects of Present Disclosure

According to the present disclosure, it is possible to provide an optical fiber capable of realizing a further reduction in the transmission loss.

Description of Embodiments of Present Disclosure

First, embodiments of the present disclosure will be listed and described. An optical fiber according to an embodiment is formed from silica-based glass. The optical fiber includes a core including a central axis, and a cladding surrounding the core. A refractive index of the core is greater than a refractive index of the cladding. The core contains chlorine, and one or more kinds of elements selected from an element group consisting of alkali metal elements and alkaline earth metal elements. A relative refractive index difference of the core based on a refractive index of pure silica is 0.00% or greater and 0.15% or less. An average concentration of fluorine in the cladding is 1.2% or less in a mass fraction.

In the optical fiber according to the embodiment, since the average concentration of fluorine in the cladding is 1.2% or less in a mass fraction, a further reduction in a transmission loss can be realized.

The average concentration of fluorine in the cladding may be 1.1% or less in a mass fraction. In this case, the further reduction in the transmission loss can be realized more reliably.

In the cladding, the average concentration of fluorine in a region where a distance from the central axis is one to two times a radius of the core may be 1.2% or less in a mass fraction. In this case, a further reduction in the transmission loss can be realized.

In the cladding, the average concentration of fluorine in a region where a distance from the central axis is one to two times a radius of the core may be 1.1% or less in a mass fraction. In this case, a further reduction in the transmission loss can be realized more reliably.

An optical fiber according to another embodiment is formed from silica-based glass. The optical fiber includes a core including a central axis and a cladding surrounding the core. A refractive index of the core is greater than a refractive index of the cladding. The core contains chlorine, and one or more kinds of elements selected from an element group consisting of alkali metal elements and alkaline earth metal elements. A relative refractive index difference of the core based on a refractive index of pure silica is −0.15% or greater and 0.05% or less. An average concentration of fluorine in the cladding is 1.4% or less in a mass fraction.

In the optical fiber according to the other embodiment, since the average concentration of fluorine in the cladding is 1.4% or less in a mass fraction, a further reduction in the transmission loss can be realized.

The average concentration of fluorine in the cladding may be 1.3% or less in a mass fraction. In this case, a further reduction in the transmission loss can be realized more reliably.

In the cladding, the average concentration of fluorine in a region where a distance from the central axis is one to two times a radius of the core may be 1.4% or less in a mass fraction. In this case, a further reduction in the transmission loss can be realized.

In the cladding, the average concentration of fluorine in a region where a distance from the central axis is one to two times a radius of the core may be 1.3% or less in a mass fraction. In this case, a further reduction in the transmission loss can be realized more reliably.

A difference between a maximum value and a minimum value of a residual stress of the optical fiber may be 10 MPa or greater. In this case, characteristic adjustments such as lengthening of a cut-off wavelength of the optical fiber can be carried out.

An effective area of the optical fiber may be 70 $\mu m^2$ or greater and 90 $\mu m^2$ or less. In this case, communication capacity can be secured.

An outer diameter of the cladding may be 124 $\mu m$ or greater and 126 $\mu m$ or less, and a residual stress of the optical fiber becomes a maximum value in a region where a distance from the central axis is 20 $\mu m$ or greater and 55 $\mu m$ or less. In this case, the residual stress in this region can be set as a tensile stress, and thus the cut-off wavelength of the optical fiber can be lengthened. Note that, in the present disclosure, in a case where the residual stress is the tensile stress, the residual stress is noted as "a positive value", and in a case where the residual stress is a compressive stress, the residual stress is noted as "a negative value". "Magnitude of a residual stress" is based on the definition.

The outer diameter of the cladding may be 124 $\mu m$ or greater and 126 $\mu m$ or less, and in the optical fiber, a minimum value of a residual stress in a region where a distance from the central axis is 50 $\mu m$ or greater and 62.5 $\mu m$ or less may be 10 MPa or less. In this case, on an inner side of the region, the residual stress can be set as a tensile stress, and the cut-off wavelength of the optical fiber can be lengthened.

An average concentration of one or more kinds of elements selected from the element group consisting of alkali metal elements and alkaline earth metal elements in the core may be 0.2 ppm or greater and 200 ppm or less in a mass fraction. In this case, since the average concentration is 0.2 ppm or greater, Rayleigh scattering loss can be sufficiently lowered. Since the average concentration is 200 ppm or less, an increase in a loss due to a fluctuation in a concentration of potassium can be suppressed.

The element group may consist of sodium, potassium, cesium, and calcium. In this case, in any element, viscosity of the core is reduced, and the Rayleigh scattering loss can be lowered.

Details of Embodiments of Present Disclosure

Specific examples of the optical fiber of the present disclosure will be described with reference to the accompanying drawings. Note that, the invention is not limited to the examples, and the invention is represented by the accompanying claims and is intended to include meaning equivalent to the accompanying claims and all modifications in the scope of the invention. In description of the accompanying drawings, the same reference numeral will be given to the same element, and reductant description thereof will be omitted.

FIG. 1 is a diagram illustrating a cross-section view of the optical fiber according to an embodiment. As illustrated in FIG. 1, an optical fiber 1 of this embodiment includes a core 10 including a central axis C, a cladding 20 that surrounds the core 10, and a resin coating (not illustrated) that surrounds the cladding 20. The cladding 20 includes a first cladding 21 that surrounds the core 10 and a second cladding 22 that surrounds the first cladding 21. The cross-sectional view in FIG. 1 shows a cross-section orthogonal to the central axis C. The optical fiber 1 is formed from silica-based glass. A refractive index of the core 10 is greater than a refractive index of the cladding 20. For example, an effective area of the optical fiber 1 is 70 $\mu m^2$ or greater and 90 $\mu m^2$ or less. For example, a difference between a maximum value and a minimum value of a residual stress of the optical fiber 1 is 10 MPa or greater.

For example, a core diameter (a diameter of the core 10) is 8 $\mu m$ or greater and 15 $\mu m$ or less. For example, a first cladding diameter (outer diameter of the first cladding 21) is 20 $\mu m$ or greater and 60 $\mu m$ or less. For example, a second cladding diameter (outer diameter of the second cladding 22) is 124 $\mu m$ or greater and 126 $\mu m$ or less. In this embodiment, the second cladding diameter is also the cladding diameter (outer diameter of the cladding 20). In this embodiment, the core diameter is 9 $\mu m$ or greater and 10 $\mu m$ or less, and the cladding diameter is 125 $\mu m$.

The core 10 contains chlorine (Cl) and fluorine (F). The core 10 contains one or more kinds of elements selected from an element group (hereinafter, referred to as "alkali metal element group") consisting of alkali metal elements and alkaline earth metal elements. For example, the alkali metal element group may consist of sodium (Na), potassium (K), cesium (Cs), and calcium (Ca). In this case, the alkali metal element group includes sodium, potassium, and cesium as the alkali metal elements, and includes calcium as the alkaline earth metal elements.

A relative refractive index difference of the core 10 based on a refractive index of pure silica may be, for example, 0.00% or greater and 0.15% or less, or 0.05% or greater and 0.07% or less. In this case, an average concentration ($F_{ave}$) of fluorine in the cladding 20 is, for example, 0.55% or greater and 1.2% or less. According to this, a further reduction in a transmission loss can be realized. The average concentration ($F_{ave}$) of fluorine in the cladding 20 may be, for example, 0.60% or greater and 1.1% or less in a mass fraction. According to this, a further reduction in the transmission loss can be realized more reliably.

The relative refractive index difference of the core 10 based on the refractive index of pure silica may be, for example, −0.15% or greater and 0.05% or less, or −0.08% or greater and −0.05% or less. In this case, the average concentration ($F_{ave}$) of fluorine in the cladding 20 is, for example, 1.0% or greater and 1.4% or less in a mass fraction. According to this, a further reduction in the transmission loss can be realized. The average concentration ($F_{ave}$) of fluorine in the cladding 20 may be, for example, 1.1% or greater and 1.3% or less in a mass fraction. According to this, a further reduction in the transmission loss can be realized more reliably.

Here, the average concentration ($F_{ave}$) of fluorine in the cladding 20 may be defined as an average concentration of fluorine in an entire cladding region, or may be defined as an average concentration of fluorine in the cladding 20 in a region where a distance from a central axis is one to two times a radius of the core 10. In the latter case, the average concentration of fluorine in the cladding 20 represents an average value of a concentration of fluorine in the cladding 20 in a range from the core diameter to two times the core diameter, that is, a region relatively close to the core, and can be calculated as in the following Expression (1). F(r) represents a local concentration of fluorine, and a represents a radius of the core 10.

$$F_{ave} = \frac{\int_a^{2a} \int_0^{2\pi} F(r) r dr d\theta}{3\pi a^2} \quad (1)$$

In the core 10, an average concentration of elements in the alkali metal element group is 0.2 ppm or greater and 200 ppm or less in a mass fraction. For example, in a case where the core 10 contains potassium, an average concentration of K in the core 10 can be calculated as in the following Expression (2). K(r) represents a local concentration of K, and a represents a radius of the core 10.

$$K_{ave} = \frac{\int_0^a \int_0^{2\pi} K(r) r dr d\theta}{\pi a^2} \quad (2)$$

Figure 2:
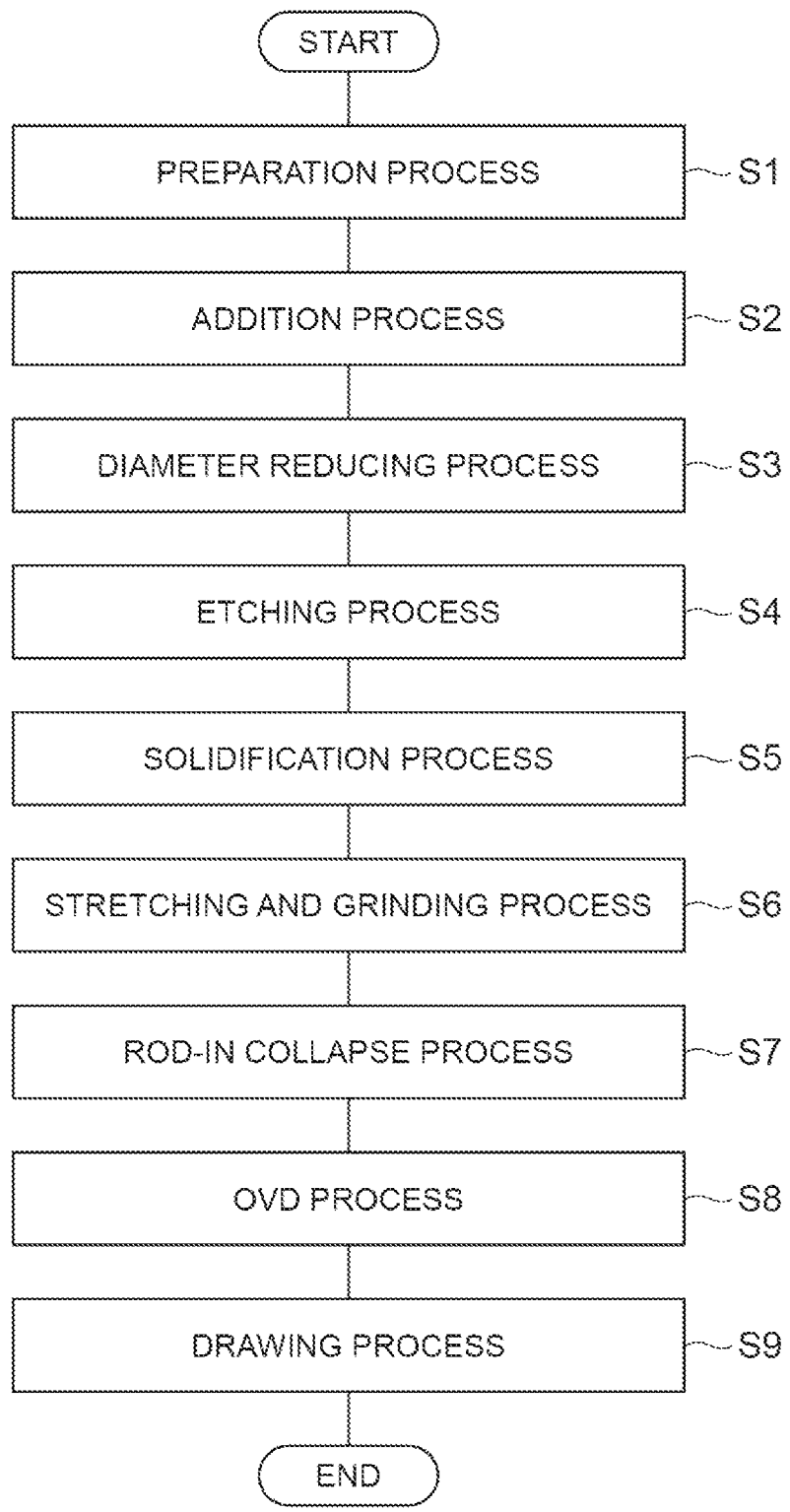
FIG. 2 is a flowchart describing a method of manufacturing the optical fiber illustrated in FIG. 1.

FIG. 2 is a flowchart describing a method of manufacturing the optical fiber in FIG. 1. In the following description, an example of specific conditions is also described. The optical fiber is manufactured sequentially through a preparation process (step S1), an addition process (step S2), a diameter reducing process (step S3), an etching process (step S4), a solidification process (step S5), a stretching and grinding process (step S6), a rod-in collapse process (step S7), an OVD process (step S8), and a drawing process (step S9).

In the preparation process (step S1), a glass pipe of silica-based glass to which an alkali metal element group (dopant) is caused to diffuse is prepared. A silica-based glass cylindrical body that is a source of the glass pipe contains chlorine in a constant concentration and fluorine in a constant concentration, and a concentration of other dopants and impurities is 10 ppm or less in a mass fraction. An outer diameter of the glass pipe of the silica-based glass is 30 mm or greater and 40 mm or less, and an inner diameter thereof is 15 mm or greater and 25 mm or less.

In the addition process (step S2), a potassium (K) element is added to an inner surface of the glass pipe of the silica-based glass as a dopant of the alkaline metal element group. As a raw material, 6 g or greater and 10 g or less of potassium bromide (KBr) is used. The raw material is heated to a temperature of 750° C. or higher and 850° C. or lower by an external heat source to generate a raw material vapor. The glass pipe of the silica-based glass is heated from the outside with an oxyhydrogen burner so that a temperature of an outer surface of the glass pipe of the silica-based glass becomes 1600° C. or higher and 1800° C. or lower while introducing the raw material vapor into the glass pipe of the silica-based glass in combination with a carrier gas composed of oxygen in a flow rate of 1 SLM (1 liter/min in terms of a volume at 0° C. and 1013 hPa). At this time, heating is performed in a total of 10 turns or greater and 15 turns or less by traversing the burner at a speed of 30 mm/min or greater and 60 mm/min or less, and the K element is diffused and added to the inner surface of the glass pipe of the silica-based glass.

In the diameter reducing process (step S3), the diameter of the glass pipe of the silica-based glass to which K has been added is reduced. At this time, the glass pipe of the silica-based glass is heated by an external heat source so that an outer surface of the glass pipe of the silica-based glass becomes 2000° C. or higher and 2300° C. or lower while causing oxygen to flow into the glass pipe of the silica-based glass in a flow rate of 0.5 SLM or greater and 1.0 SLM or less. Heating is performed in a total of 6 turns or greater and 10 turns or less by traversing the external heat source, and the diameter of the silica glass pile is reduced until the inner diameter becomes 3 mm or greater and 6 mm or less.

In the etching process (step S4), an inner surface of the glass pipe of the silica-based glass is etched. At this time, vapor phase etching is performed by heating the silica glass pipe by an external heat source while introducing a mixed gas of $SF_6$ (0.2 SLM or greater and 0.4 SLM or less) and chlorine (0.5 SLM or greater and 1.0 SLM or less) into the silica glass pipe. In this way, the pipe inner surface containing impurities added in a high concentration together with a target dopant can be ground, and the impurities can be removed.

In the solidification process (step S5), the glass pipe of the silica-based glass is solidified. In the solidification process, a mixed gas of oxygen (0.1 SLM or greater and 0.5 SLM or less) and He (0.5 SLM or greater and 1.0 SLM or less) is introduced into a silica glass pipe 30, and a surface temperature is set to 2000° C. or higher and 2300° C. or lower while reducing an absolute pressure inside the silica glass pipe to 97 kPa or lower, thereby solidifying the silica glass pipe. According to the solidification, the core portion (having an outer diameter of 20 mm or greater and 30 mm or less) is obtained. A core layer that does not contain the alkali metal element group may be applied to an outer side of the rod by a known method such as an outside vapor deposition (OVD) method or a collapse method.

In the stretching and grinding process (step S6), the core portion is stretched to have a diameter of 20 mm or greater and 25 mm or less, and an outer peripheral portion of the core portion is further ground to a diameter of 15 mm or greater and 20 mm or less. This portion becomes the core of the optical fiber.

In the rod-in collapse process (step S7), a first cladding portion is provided on an outer side of the core portion. At this time, a rod-in collapse method is used. In this method, the core portion is inserted into the glass pipe of the silica-based glass to which fluorine has been added, and the core portion and the glass pipe are heated by an external heat source to be integrated with each other. As a result of the combination by the rod-in collapse method, the amount of moisture in the core portion and the first cladding portion in the vicinity of the core portion can be suppressed to be sufficiently low.

In the OVD process (step S8), a rod in which the core portion and the first cladding portion are integrated is stretched to have a predetermined diameter, and a second cladding portion containing fluorine is combined to an outer side of the rod by the OVD method to manufacture an optical fiber base material.

In the drawing process (step S9), the optical fiber base material manufactured by the above-described optical fiber base material manufacturing method is drawn to obtain an optical fiber. In this process, the optical fiber base material is heated with a drawing furnace and the optical fiber is drawn, and then the optical fiber is slowly cooled in a slow cooling furnace provided downstream of the drawing furnace. A drawing tensile force and a temperature of the slow cooling furnace are adjusted with respect to each optical fiber base material so that a transmission loss becomes the minimum while satisfying a condition in which a cut-off wavelength is less than 1530 nm.

In the optical fiber 1, the cut-off wavelength is less than 1530 nm. To satisfy the condition, a refractive index of the optical fiber 1 is changed from a refractive index of the optical fiber base material by the following Method 1 or Method 2. Method 1 is a method in which a residual stress inside the optical fiber 1 is changed by changing the drawing tensile force in the drawing process, and according to this, the refractive index of the optical fiber 1 is changed. Method 2 is a method in which the residual stress inside the optical fiber 1 is changed by heating an outermost periphery of the glass through slow cooling in the drawing process, and according to this, the refractive index of the optical fiber 1 is changed. Particularly, in Method 2, a stress that remains in the outermost peripheral portion is made to be smaller in comparison to an optical fiber that is not slowly cooled in the drawing, and thus the tensile stress of a portion in which the tensile stress remains can be made to be greater. As a result, the cut-off wavelength can be adjusted (lengthened). In this manner, in the drawing process, adjustment of optical design is performed by changing the refractive index, and thus the concentration of fluorine that is originally contained in the cladding portion of the optical fiber base material can be lowered. Accordingly, a reduction in the transmission loss due to a fluctuation in the concentration of the fluorine in the cladding 20 and desired optical characteristics are compatible with each other.

According to Method 1, a residual stress of the optical fiber 1 becomes a maximum value, for example, in a region where a distance from the central axis C is 20 μm or greater and 55 μm or less. For example, the maximum value is within a range of 5 MPa or greater and 50 MPa or less. The optical fiber 1 is provided with a portion in which the residual stress is a tensile stress in the region where the distance from the central axis C is 20 μm or greater and 55 μm or less, and thus the cut-off wavelength can be lengthened. According to Method 2, a minimum value of the residual stress in a region where the distance from the central axis C is 50 μm or greater and 62.5 μm or less is, for example, 10 MPa or less, but may be 0 MPa or less. That is, the residual stress may be a compressive stress. Note that, a distance between an outer peripheral surface of the cladding 20 and the central axis C is, for example, 62.5 μm, but when the distance is 50 μm or greater and 75 μm or less, design adjustment is possible from the same viewpoint. In the optical fiber 1, the residual stress is set as the tensile stress on the central axis C side rather than the region where the distance from the central axis C is 50 μm or greater and 62.5 μm or less, and according to this, the cut-off wavelength can be lengthened.

Table 1 is a table that summarizes specifications of each of nine kinds of Optical Fibers 1 to 9 which are manufactured and evaluated. This table shows an average concentration ($K_{ave}$) of K in the core, a transmission loss ($\alpha_{1.55}$) at a wavelength of 1550 nm, a core diameter, a cut-off wavelength, an effective area ($A_{eff}$), and an average concentration ($F_{ave}$) of fluorine in the cladding with respect to each of Optical Fibers 1 to 9. In Optical Fibers 1 to 9, a relative refractive index difference of the core based on a refractive index of the cladding varies from 0.25% to 0.45%. When manufacturing Optical Fibers 1 to 9, as described above, the drawing stress and the temperature of the slow cooling furnace were adjusted with respect to each optical fiber base material so that the transmission loss became the minimum while satisfying a condition in which the cut-off wavelength is less than 1530 nm. A relative refractive index difference of the core based on a refractive index of pure silica was 0.05% or greater and 0.07% or less. Measurement of the concentration was performed by, for example, using an electron probe micro analyzer (EPMA) after polishing a sample surface. At this time, an acceleration voltage was set to 20 kV, a probe beam diameter was set to 1 μm or less, and a measurement interval was set to 100 nm or less.

TABLE 1

| | $K_{ave}$ [ppm] | $\alpha_{1.55}$ [dB/km] | Core diameter [μm] | Cut-off wavelength [nm] | $A_{eff}$ [μm²] | $F_{ave}$ [%] |
|---|---|---|---|---|---|---|
| Fiber 1 | 41 | 0.149 | 9.8 | 1469 | 80 | 0.61 |
| Fiber 2 | 41 | 0.147 | 9.9 | 1493 | 80 | 0.66 |
| Fiber 3 | 41 | 0.146 | 9.5 | 1484 | 81 | 0.71 |
| Fiber 4 | 42 | 0.145 | 9.8 | 1470 | 83 | 0.76 |
| Fiber 5 | 41 | 0.145 | 9.5 | 1470 | 81 | 0.82 |
| Fiber 6 | 39 | 0.146 | 9.6 | 1470 | 83 | 0.85 |
| Fiber 7 | 39 | 0.147 | 9.8 | 1460 | 81 | 0.92 |
| Fiber 8 | 41 | 0.148 | 9.6 | 1497 | 80 | 1.00 |
| Fiber 9 | 38 | 0.150 | 9.3 | 1494 | 80 | 1.12 |

Figure 3:
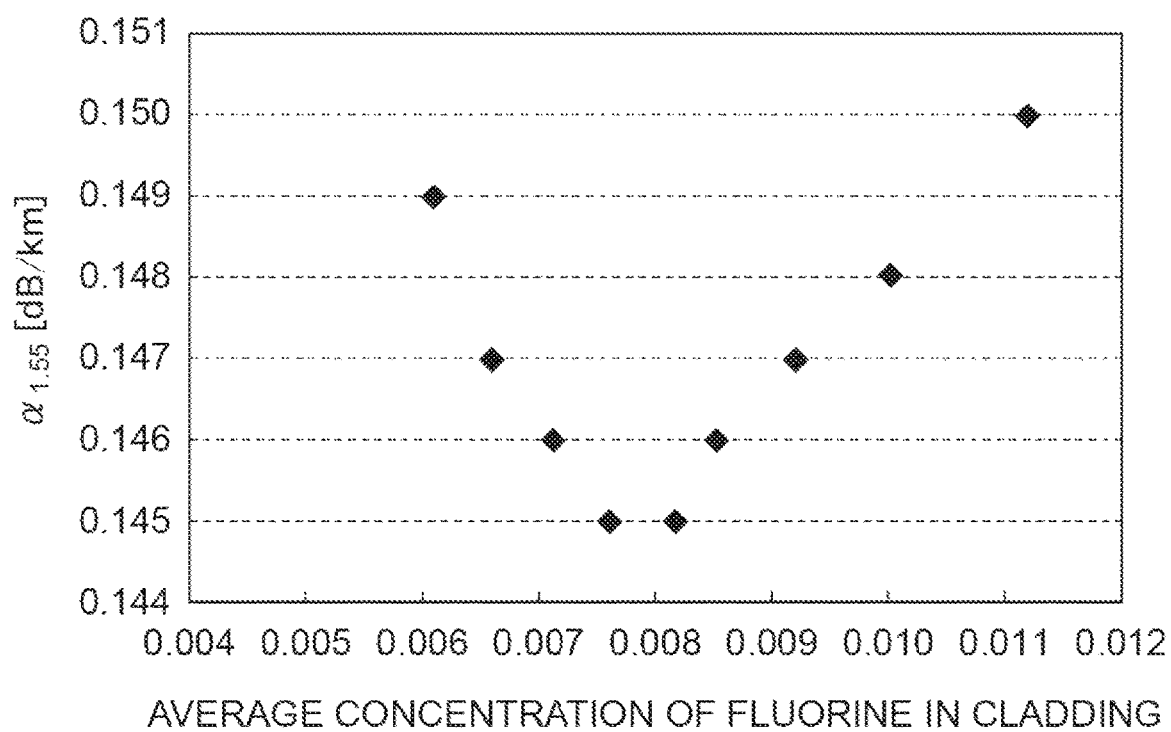
FIG. 3 is a graph illustrating a relationship between an average concentration of fluorine in a cladding and a transmission loss at a wavelength of 1550 nm with respect to Optical Fiber 1 to Optical Fiber 9.

FIG. 3 is a graph illustrating a relationship between an average concentration of fluorine in the cladding and the transmission loss at a wavelength of 1550 nm with respect to Optical Fibers 1 to 9. As illustrated in FIG. 3, it was confirmed that the transmission loss tends to be the minimum when the average concentration of fluorine in the cladding is near 0.8% in a mass fraction.

Table 2 is a table that summarizes specifications of nine kinds of Optical Fibers 10 to 18 which are manufactured and evaluated. This table shows the average concentration of K in the core, the transmission loss at a wavelength of 1550 nm, the core diameter, the cut-off wavelength, the effective area, and the average concentration of fluorine in the cladding with respect to each of Optical Fibers 10 to 18. In Optical Fibers 10 to 18, a relative refractive index difference of the core based on a refractive index of the cladding varies from 0.25% to 0.45%. Also, when manufacturing Optical Fibers 10 to 18, as described above, the drawing stress and the temperature of the slow cooling furnace were adjusted with respect to each optical fiber base material so that the transmission loss became the minimum while satisfying a condition in which the cut-off wavelength is less than 1530 nm. A relative refractive index difference of the core based on a refractive index of pure silica was −0.08% or greater and −0.05% or less. Measurement of the concentration was performed by, for example, using the electron probe micro analyzer (EPMA) after polishing a sample surface. At this time, an acceleration voltage was set to 20 kV, a probe beam diameter is set to 1 μm or less, and a measurement interval was set to 100 nm or less.

TABLE 2

|  | $K_{ave}$ [ppm] | $\alpha_{1.55}$ [dB/km] | Core diameter [μm] | Cut-off wavelength [nm] | $A_{eff}$ [μm$^2$] | $F_{ave}$ [%] |
|---|---|---|---|---|---|---|
| Fiber 10 | 40 | 0.148 | 9.3 | 1490 | 79 | 1.06 |
| Fiber 11 | 39 | 0.147 | 9.6 | 1484 | 81 | 1.11 |
| Fiber 12 | 38 | 0.145 | 9.9 | 1459 | 83 | 1.16 |
| Fiber 13 | 39 | 0.143 | 9.5 | 1470 | 79 | 1.22 |
| Fiber 14 | 40 | 0.145 | 9.9 | 1464 | 78 | 1.26 |
| Fiber 15 | 41 | 0.147 | 9.3 | 1453 | 79 | 1.30 |
| Fiber 16 | 41 | 0.149 | 9.8 | 1480 | 80 | 1.35 |
| Fiber 17 | 41 | 0.150 | 9.6 | 1470 | 81 | 1.41 |
| Fiber 18 | 38 | 0.152 | 9.5 | 1471 | 83 | 1.46 |

Figure 4:
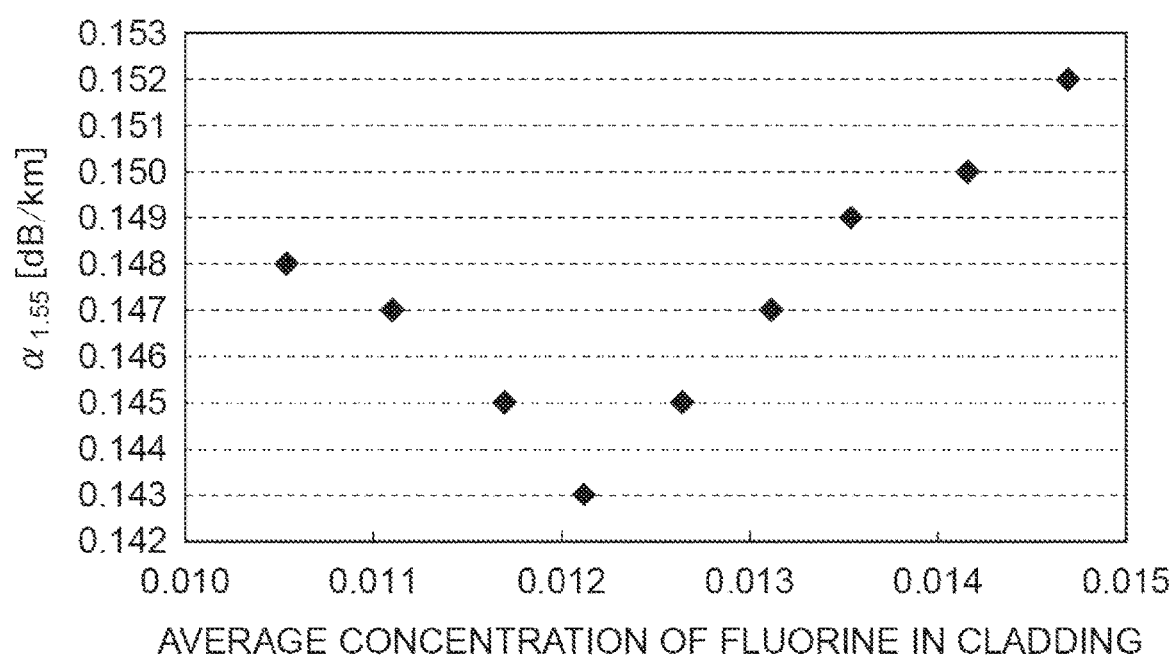
FIG. 4 is a graph illustrating a relationship between the average concentration of fluorine in the cladding and the transmission loss at a wavelength of 1550 run with respect to Optical Fiber 10 to Optical Fiber 18.

FIG. 4 is a graph illustrating a relationship between an average concentration of fluorine in the cladding and the transmission loss at a wavelength of 1550 nm with respect to Optical Fibers 10 to 18. As illustrated in FIG. 4, it was confirmed that the transmission loss tends to be the minimum when the average concentration of fluorine in the cladding is near 1.2% in a mass fraction.

Table 3 is a table that summarizes specifications of each of five kinds of Optical Fibers 19 to 23 which are manufactured and evaluated. This table shows the average concentration ($K_{ave}$) of K in the core, the transmission loss ($\alpha_{1.55}$) at a wavelength of 1550 nm, the core diameter, the cut-off wavelength, the effective area ($A_{eff}$), and the average concentration ($F_{ave}$) of fluorine in the cladding, and a micro-bend loss (μ-bend loss) with respect to each of Optical Fibers 19 to 23. The micro-bend loss was measured by a mesh bobbin test defined by IEC TR62221. In Optical Fiber 19 to 23, the effective area was changed in a range of 80 μm$^2$ to 124 μm$^2$. The relative refractive index difference of the core based on the refractive index of the cladding is changed in a range of 0.25% to 0.45%. It was confirmed that the micro-bend loss tends to increase to 0.4 dB/km or greater when the effective area exceeds 90 μm$^2$.

TABLE 3

|  | $K_{ave}$ [ppm] | $\alpha_{1.55}$ [dB/km] | Core diameter [μm] | Cut-off wavelength [nm] | $A_{eff}$ [μm$^2$] | $F_{ave}$ [%] | μ-bend loss [dB/km] |
|---|---|---|---|---|---|---|---|
| Fiber 19 | 40 | 0.148 | 9.6 | 1496 | 80 | 1.20 | 0.3 |
| Fiber 20 | 40 | 0.147 | 10.5 | 1487 | 91 | 1.11 | 0.4 |
| Fiber 21 | 39 | 0.145 | 11.0 | 1475 | 100 | 1.01 | 0.5 |
| Fiber 22 | 41 | 0.143 | 12.1 | 1454 | 112 | 0.92 | 0.6 |
| Fiber 23 | 40 | 0.145 | 12.5 | 1494 | 124 | 0.80 | 0.7 |

The transmission loss depends on the concentration of the alkali metal element group contained in the core. However, in Optical Fibers 1 to 23, it is considered that the effect is small because the concentration of the alkali metal element group is unified to 40 ppm in a mass fraction.

REFERENCE SIGNS LIST

1: optical fiber, 10: core, 20: cladding, 21: first cladding, 22: second cladding, C: central axis.

The invention claimed is:

1. An optical fiber formed from silica-based glass, the optical fiber comprising:
   a core including a central axis; and
   a cladding surrounding the core,
   wherein a refractive index of the core is greater than a refractive index of the cladding,
   the core contains chlorine, and one or more kinds of elements selected from an element group consisting of alkali metal elements and alkaline earth metal elements,
   a relative refractive index difference of the core based on a refractive index of pure silica is 0.00% or greater and 0.15% or less, and
   wherein in the cladding, the average concentration of fluorine in a region where a distance from the central axis is one to two times a radius of the core is 1.2% or less in a mass fraction.

2. The optical fiber according to claim 1,
   wherein in the cladding, the average concentration of fluorine in a region where a distance from the central axis is one to two times a radius of the core is 1.1% or less in a mass fraction.

3. An optical fiber formed from silica-based glass, the optical fiber comprising:
   a core including a central axis; and
   a cladding surrounding the core,
   wherein a refractive index of the core is greater than a refractive index of the cladding,
   the core contains chlorine, and one or more kinds of elements selected from an element group consisting of alkali metal elements and alkaline earth metal elements,
   a relative refractive index difference of the core based on a refractive index of pure silica is −0.15% or greater and 0.05% or less, and wherein in the cladding, the average concentration of fluorine in a region where a distance from the central axis is one to two times a radius of the core is 1.4% or less in a mass fraction.

4. The optical fiber according to claim 3, wherein in the cladding, the average concentration of fluorine in a region where a distance from the central axis is one to two times a radius of the core is 1.3% or less in a mass fraction.

5. The optical fiber according to claim 1, wherein a difference between a maximum value and a minimum value of a residual stress of the optical fiber is 10 MPa or greater.

6. The optical fiber according to claim 1, wherein an effective area of the optical fiber is 70 $\mu m^2$ or greater and 90 $\mu m^2$ or less.

7. The optical fiber according to claim 1, wherein an outer diameter of the cladding is 124 $\mu m$ or greater and 126 $\mu m$ or less, and a residual stress of the optical fiber becomes a maximum value in a region where a distance from the central axis is 20 $\mu m$ or greater and 55 $\mu m$ or less.

8. The optical fiber according to claim 1, wherein an outer diameter of the cladding is 124 $\mu m$ or greater and 126 $\mu m$ or less, and in the optical fiber, a minimum value of a residual stress in a region where a distance from the central axis is 50 $\mu m$ or greater and 62.5 $\mu m$ or less is 10 MPa or less.

9. The optical fiber according to claim 1, wherein an average concentration of the one or more kind of elements in the core is 0.2 ppm or greater and 200 ppm or less in a mass fraction.

10. The optical fiber according to claim 1, wherein the element group consists of sodium, potassium, cesium, and calcium.

* * * * *